United States Patent Office 3,428,707
Patented Feb. 18, 1969

3,428,707
MODIFIED VINYL CHLORIDE POLYMER
COMPOSITIONS
James L. Amos, Edward D. Baretta, and James J. Dahl, Midland, Mich., assignors to The Dow Chemical Company, Midland, Mich., a corporation of Delaware
No Drawing. Filed May 10, 1965, Ser. No. 454,735
U.S. Cl. 260—827   7 Claims
Int. Cl. C08f 29/18, 15/38; C08g 47/10

ABSTRACT OF THE DISCLOSURE

This invention relates to compositions, and a process for preparing the same, containing a vinyl chloride polymer as the major constituent in combination with minor amounts of certain elastomeric copolymer modifiers and small but highly effective amounts of certain diorganopolysiloxanes. These compositions are easily processable, flame-resistant and are further characterized by having exceptionally high impact strength values and are particularly well suited for use in the preparation of molten or extruded articles of the rigid, chemically resistant and flame resistant type such as pipes, tubing, sheeting and blown bottles and the like.

---

For many purposes, there is an advantage to prepare rigid fabricated products of vinyl chloride polymers. Among other attributes of such polymers, these are exceptionally well suited where non-burnable or self-extinguishing requirements are called for. However, due to the sensitive nature of the polymers to heat, serious problems have been encountered in fabricating articles or products at temperatures necessary to fluidize the polymer sufficiently for it to be extruded or otherwise fabricated.

One method employed to overcome the attendant problems in fabricating vinyl chloride polymers is the addition of certain plasticizers in quantities of about 25 to 100 parts per 100 parts of polymer. However, articles prepared from this plasticized polymer are soft and flexible and unsuited for use in manufacturing hard, substantially rigid articles. Moreover, the heat distortion temperatures of these materials are generally greatly reduced by the addition of such plasticizers.

Certain polymeric modifiers have also been proposed as processing aids for vinyl chloride polymers. However, conventionally used polymeric modifiers have little or no effect upon improving the heat distortion temperatures of vinyl chloride polymers unless incorporated in amounts which deleteriously affect the self-extinguishing properties of the vinyl chloride polymer.

It has been found, however, that a vinyl chloride polymer can be modified to give resinous compositions of improved processability and enhanced physical characteristics, without adversely affecting the self-extinguishing or other properties of the composition, by intimately admixing a vinyl chloride polymer, e.g., polyvinyl chloride, with minor amounts of a copolymeric modifying agent derived from certain mixtures of a conjugated diolefin, at least one alkenyl aromatic compound and at least one lower alkyl ester of acrylic or methacrylic acids; which compositions, and their method of manufacture, are described in the U.S. patent application Ser. No. 168,079, filed on Jan. 23, 1962, now abandoned, in the name of Edward D. Baretta et al., for "Modified Polyvinyl Chloride Compositions."

It is an object of the present invention to further enhance the processability and impact strength of such modified vinyl chloride polymer compositions without attendant loss of other physical properties.

It has been discovered that this object is attained by intimately admixing with such modified vinyl chloride polymer compositions from about 0.5 to 2 percent, based on the weight of such composition, of a diorganopolysiloxane, as hereinafter defined.

More particularly, the compositions of the present invention comprise an intimate admixture of (A) from 73 to 92 percent by weight of at least one vinyl chloride polymer consisting of at least 85 percent by weight of vinyl chloride and not more than 15 percent by weight of a different ethylenically unsaturated monomer that is copolymerizable with vinyl chloride, (B) from 8 to 27 percent by weight of a copolymer derived by polymerizing a mixture of monomers consisting of (1) from 30 to 50 percent by weight of a conjugated diolefin, (2) from 10 to 45 percent by weight of an alkenyl aromatic compound, (3) from 15 to 55 percent by weight of an ester selected from the group consisting of the methyl and ethyl esters of acrylic acid and methacrylic acid, and (4) from 6 to 12 percent by weight of a compound selected from the group consisting of acrylonitrile and methacrylonitrile, the said mixture of monomers being selected from the group consisting of (I) 1, 2 and 3, and (II) 1, 2, 3 and 4, the amount of each of said monomers being expressed as a percentage of the total weight of said monomers and within the ranges stated above; and in addition (C) from about 0.5 to 2 percent by weight, based on the total weight of (A) and (B), of a diorganopolysiloxane derived from the condensation of at least one compound selected from the group of organosilane diols having the structural formula:

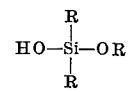

where R is a radical selected from the group consisting of lower alkyl radicals and the phenyl radical.

The term "vinyl chloride polymer" as used herein, is intended to include the homopolymer of vinyl chloride and copolymers of at least about 85 percent by weight of vinyl chloride and up to 15 percent by weight of other monomers copolymerizable therewith, such as vinyl acetate, vinyl butyrate, vinyl stearate, vinyl benzoate, dialkyl fumarates, dialkyl maleates, vinylidene chloride and the like.

The alkenyl aromatic component (2) of the monomer mixture forming the copolymer modifier for such vinyl chloride polymer, may be styrene, alpha-methylstyrene, vinyl toluene, p-chlorostyrene or the like or mixtures thereof, whereas the diolefin (1) may be butadiene, isoprene, chloroprene or the like.

The preferred method of carrying out the preparation of the copolymer modifier gives rise to an intimate blend of the copolymer and vinyl chloride polymer directly and in the form of an easily handled, free flowing powder. According to this method, the monomer mixture containing an oil soluble, free-radical producing polymerization catalyst is added to a suspension of vinyl chloride polymer articles in an aqueous medium in a suitable reaction vessel provided with means for agitation. The resulting mixture is agitated and is brought to a temperature at which it is desired to effect polymerization and is maintained at that temperature until the desired degree of conversion is obtained. After cooling of the reactor and venting of the unreacted monomers, the product is readily recovered from the aqueous medium by filtration. After drying, the free flowing powder is ready for use. If desired, the drying may be carried out under reduced pressure in order to remove any residual, unreacted monomers that may be trapped in the particles.

In general, the mixture of monomers will constitute from about 10 percent to about 30 percent by weight of the total of such mixtures and the vinyl chloride polymer.

Accordingly, depending on the degree of conversion achieved during the polymerization, in the final product the copolymer modifier will represent from about 8 percent to about 27 percent of the weight of the final product. As a practical matter, the polymerization reaction will ordinarily be carried to at least 70 percent conversion. Preferably, however, the polymerization is carried to a conversion of about 95 percent. Higher conversions may, of course, be achieved if desired, but the time required to carry the polymerization to substantial completion generally dictates a lower value.

The copolymer modifier may, if desired, be prepared in known manner by the emulsion polymerization in an aqueous medium of the mixture of the monomers. From the resulting latex, the copolymer may be recovered by conventional techniques such as the addition to the latex of certain coagulant electrolytes such as calcium chloride, aluminum sulfate, acetic acid or the like. After being washed and freed of water, the resulting copolymer may be intimately admixed with the vinyl chloride polymer on a two-roll mill. Alternatively, the copolymer modifier latex may be admixed with a latex of vinyl chloride polymer, or with an aqueous suspension thereof, and the admixed modifier and resin recovered from the resulting mixture in known manner.

The diorganopolysiloxanes to be employed in accordance with the present invention are liquid or non-liquid benzene soluble gummy or dough-like condensation products of at least one compound having the structural formula:

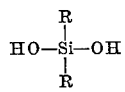

where R is a radical selected from the group consisting of lower alkyl radicals and the phenyl radical. Such materials are generally formed by the dehydration of organo silane diols. Thus, the dehydration of dimethyl silane diol $(CH_3)_2Si(OH)_2$, results in the formation of a methyl substituted siloxane chain, the molecular weight of the resulting condensation product being a function of the condensation conditions employed. In this regard, it is possible to produce liquid condensation polymers of about 0.65 centistoke at 77° F. to 1,000,000 or more centistokes at 77° F. Thus the condensation polymerization reaction is also capable of producing materials of such high molecular weight as to be solid or semi-solid at room temperature. Other diorganopolysiloxanes useful for the purposes of this invention are the methylphenyl silicones exhibiting viscosities ranging from about 50 centistokes at 77° F. to 100,000 or more centistokes at 77° F. These silicones are generally characterized by a somewhat improved high temperature stability than the dimethyl silicones, the high temperature stability generally increasing as the preparation of methyl phenyl silane diol employed in the original reaction mixture is increased. Other useful diorganopolysiloxanes include the diphenyl silane diols and the biphenyl lower alkyl silane diols, particularly wherein the alkyl group is methyl or ethyl.

Also useful for the purposes of the present invention are the non-liquid, benzene-soluble, gummy to dough-like diorganopolysiloxanes wherein all of the siloxane units are $(CH_3)_2SiO$, or the siloxane is a copolymer of dimethylsiloxane and a minor amount of any combination of the units $C_6H_5(CH_3)SiO$, or $(C_6H_5)_2SiO$, including the diorganopolysiloxane elastomers which contain a plurality, e.g., from 2,700 to 10,000, or more of the above-mentioned siloxane units. Such elastomeric diorganopolysiloxanes are unvulcanized polymers which are completely soluble in benzene. They may be prepared in known ways such as by catalytic polymerization of suitable diorganosiloxanes employing a procedure similar to that described in United States Patent No. 2,541,137.

It is to be understood, that the diorganopolysiloxanes of the present invention include the herein defined silicones which are liquid at ordinary room temperature (generically designated "silicone fluids") as well as the solid or semi-solid materials (generically designated as "uncured silicone rubbers") which are, in fact, fundamentally the same from a structural standpoint.

The compositions of the invention are usually prepared by heat-plastifying the blend of vinyl chloride polymer and copolymer modifier with the diorganopolysiloxane in the desired proportions and mechanically working the heated mixture to form a homogeneous composition. Mixing or compounding the ingredients with one another may be carried out in a Banbury mixer, or on heated compounding rolls, in known ways.

In a preferred practice a granular mixture of vinyl chloride polymer and copolymeric modifier, prepared as hereinbefore described, is heat-plastified, e.g., by milling on heated compounding rolls, and the diorganopolysiloxane added in the desired proportion. The mixture is mechanically worked at temperatures between about 150° and 200° C. to incorporate the ingredients with one another and to produce a homogeneous or substantially uniform composition. In this regard, it has unexpectedly been found (as illustrated by the data as set forth in the following example) that compositions of unusually high impact strengths are obtained by utilizing mixing or working temperature above about 180° C. e.g., between about 190° to 200° C. Usually, mechanical working of the mixture on heated rolls, or by kneading in a Banbury mixer, for a time of from 3 to 15 minutes is sufficient to result in the formation of a uniform composition, although mechanical working of the mixture may be continued for longer periods of time. The composition is usually removed from the rolls or mixer and cooled or allowed to cool to room temperature or thereabout, then cut or ground to a form suitable for molding. In an alternate procedure the heat-plastified composition may be sheeted out, or fed to a plastic extruder and formed into thin bands, sheets, ribbons or rods, then cooled or cut or ground to a granular form. Small amounts of dyes, pigments or other coloring agents and stabilizers may also be incorporated with the composition. Such compositions are particularly useful for the provision of molten or extruded articles or otherwise shaped or fabricated articles of the rigid, chemically resistant and flame resistant type such as pipes, tubing, sheeting and blown bottles and the like.

The following example, wherein all parts and percentages are to be taken by weight, illustrates the present invention but is not to be construed as limiting its scope.

Example I

Into a glass pressure bottle there were charged about 250 parts of distilled water and 80 parts of polyvinyl chloride having an absolute viscosity in 2 percent o-dichlorobenzene solution at 120° C. of 1.95–2.1 cps. There was then added 20 parts of a mixture of 3.2 parts α-methyl styrene, 7.8 parts of methyl methacrylate, 1.2 parts of acrylonitrile, 0.2 part of benzoyl peroxide and 0.08 part of dibromodichloroethane. Finally there was added 7.8 parts of butadiene. The bottle was then sealed and placed in a bath heated to 90° C. and provided with means for agitating the bottle and its contents. At the end of 3 hours the bottle was removed. The product was isolated by filtration, washed with water and dried at 60° C. for 3 hours. There was obtained 90 parts of a white free-flowing powder.

Thereafter, in each of a series of experiments, individual portions of the polymer prepared in accordance with this example were separately milled at a temperature of 190° C. with varying amounts of a liquid condensation polymer of dimethyl silane diol having a viscosity at 25° C. of 350 centistokes (sold commercially as Dow Corning No. 200 Fluid) or a methyl phenyl silicone having a viscosity at 25° C. of about 150 centistokes (available commercially as Dow Corning No. 550 Fluid).

The impact values of the various blends prepared are presented in the following Table I.

TABLE I

| Weight Percent Silicone in Polymers | Impact Value, ft.-lbs./inch Notch of Blends at 25° C. | |
| --- | --- | --- |
| | Blends Containing Dow Corning No. 200 Fluid | Blends Containing Dow Corning No. 550 Fluid |
| 0.0 | 1.14 | 1.14 |
| 0.25 | 1.34 | 1.95 |
| 0.75 | 12.1 | 20.6 |
| 1.0 | 25.0 | 25.7 |
| 2.0 | 22.1 | 20.9 |

It will be noted that incorporation of from 0.25 to 2 weight percent of either of the identified diorganopolysiloxanes in the polymeric product produced in accordance with the above example results in a blend having an impact value significantly higher than that of the polymer without the required amounts of such materials.

The effect of silicone addition on the tensile and flexural strength and modulus of the various blends are presented in the following Table II.

TABLE II

| Weight Percent Silicone in Polymer | Tensile Strength, p.s.i.×10³ ASTM D638–58T) | | Flexural Strength, p.s.i.×10³ (ASTM D790–59T) | |
| --- | --- | --- | --- | --- |
| | Blends Cont. Dow Corning No. 200 Fluid | Blends Cont. Dow Corning No. 550 Fluid | Blends Cont. Dow Corning No. 200 Fluid | Blends Cont. Dow Corning No. 550 Fluid |
| 0.0 | 5.83 | 5.83 | 11.58 | 11.58 |
| 0.25 | 5.90 | 5.85 | 9.70 | 9.80 |
| 0.75 | 5.54 | 4.65 | 9.65 | 9.43 |
| 1.0 | 5.59 | 5.35 | 9.15 | 8.90 |
| 2.0 | 5.51 | 4.16 | ---------------- | 7.50 |

It will be noted that increasing amounts of the indicated diorganopolysiloxanes tend to decrease slightly both the tensile and flexural strengths of the polymeric product of this example. Utilization of the required amounts of such diorganopolysiloxanes, i.e., from between about 0.25 to 2 weight percent based on polymer weight will, however, provide the optimum impact strength without significant reduction in other physical properties. Similar good results are also obtained when utilizing any of the diorganopolysiloxanes as defined herein, including the non-liquid, benzene-soluble dough-like diorganopolysiloxane elastomers.

The described effects of such silicone fluids and uncured silicone rubbers have been found to be specific to the polymeric products as described herein. Thus, by way of comparison, equivalent experiments wherein the silicones were blended with polyvinyl chloride resin, absent the defined copolymeric modifier, showed no such unexpected increase in impact strength. Further by way of comparison, equivalent experiments wherein the silicones were replaced by mineral oil or calcium stearate, resulted in no such unexpected increase in impact strength.

What is claimed is:

1. A composition of matter comprising an intimate admixture of
   (A) from 73 to 92 percent by weight of at least one vinyl chloride polymer consisting of at least 85 percent by weight of vinyl chloride and not more than 15 percent by weight of a different ethylenically unsaturated monomer that is copolymerizable with vinyl chloride,
   (B) from 8 to 27 percent by weight of a copolymer derived by polymerizing a mixture of monomers consisting of (1) from 30 to 50 percent by weight of a conjugated diolefin, (2) from 10 to 45 percent by weight of an alkenyl aromatic compound, (3) from 15 to 55 percent by weight of an ester selected from the group consisting of the methyl and ethyl esters of acrylic acid and methacrylic acid, and (4) from 6 to 12 percent by weight of a compound selected from the group consisting of acrylonitrile and methacrylonitrile, the said mixture of monomers being selected from the group consisting of (I) 1, 2, and 3, and (II) 1, 2, 3 and 4, the amount of each of said monomers being expressed as a percentage of the total weight of said monomers and within the ranges stated above;
   (C) from about 0.25 to 2 percent by weight, based on the total weight of (A) and (B), of a diorganopolysiloxane derived from the condensation of at least one compound selected from the group consisting of organosilane diols having the structural formula:

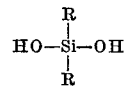

where R is a radical independently selected from the group consisting of lower alkyl radicals and the phenyl radical.

2. The composition of claim 1 wherein the said vinyl chloride polymer is polyvinylchloride.

3. The composition of claim 2 wherein the said copolymer is derived by polymerizing a mixture of monomers consisting of (1) from 30 to 50 percent by weight butadiene, (2) from 10 to 45 percent by weight of alpha-methylstyrene, (3) from 15 to 55 percent by weight of methyl methacrylate, and (4) from 6 to 12 percent of acrylonitrile.

4. A composition of matter comprising an intimate admixture of
   (A) about 80 percent by weight polyvinyl chloride,
   (B) about 20 percent by weight of a copolymer derived by polymerizing a mixture of monomers consisting of (1) about 39 percent by weight butadiene, (2) about 16 percent by weight alpha methyl styrene, (3) about 39 percent by weight methylmethacrylate and (4) about 6 percent by weight acrylonitrile, and
   (C) from about 0.25 to 2 percent by weight, based on the total weight of (A) and (B) of a diorganopolysiloxane derived from the condensation of at least one compound selected from the group consisting of organosilane diols having the structural formula:

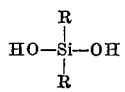

where R is a radical independently selected from the group consisting of lower alkyl radicals and the phenyl radical.

5. The composition of claim 4 wherein said diorganopolysiloxane is a polymer of dimethylsilane diol, said polymer having a viscosity at 25° C. of about 350 centistokes.

6. The composition of claim 4 wherein said diorganopolysiloxane is a polymer of methyl phenyl silane diol, said polymer having a viscosity at 25° C. of about 150 centistokes.

7. A process for making an intimate admixture of a vinyl chloride polymer and a copolymer modifier, which process comprises:
   contacting (A) from 70 to 90 parts by weight of a vinyl chloride polymer consisting of at least 85 percent by weight of vinyl chloride and not more than 15 percent by weight of a different monomer that is copolymerizable with vinyl chloride, in the form of finely divided particles, with (B) from 10 to 30 parts by weight, based on 100 parts by weight of the sum of A and B, of a mixture of monomers consisting of (1) from 30 to 50 percent by weight of a conjugated diolefin, (2) from 10 to 45 percent by weight of an alkenyl aromatic compound, (3)

from 15 to 55 percent by weight of an ester selected from the group consisting of the methyl and ethyl esters of acrylic acid and methacrylic acid, and (4) from 6 to 12 percent by weight of a compound selected from the group consisting of acrylonitrile and methacrylonitrile, the said mixture of monomers being selected from the group consisting of (I) 1, 2 and 3, and (II) 1, 2, 3 and 4, the amount of each of said monomers being expressed as a percentage of the total weight of said monomers and within the ranges stated above, and maintaining said mixture of monomers in contact with said vinyl chloride polymer at a temperature between about 50° and 90° C., in admixture with a free-radical polymerization catalyst, whereby said monomers are substantially polymerized, and thereafter admixing with said vinyl chloride polymer and said copolymer modifier with (C) from about 0.25 to 2 percent by weight of a diorganopolysiloxane derived from the condensation of at least one compound selected from the group consisting of organosilane diols having the structural formula:

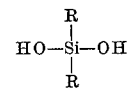

where R is a radical independently selected from the group consisting of lower alkyl radicals and the phenyl radical.

References Cited

UNITED STATES PATENTS 3,046,239  7/1962  Calvert _____ 260—29.1

FOREIGN PATENTS 1,350,935  12/1963  France.

SAMUEL H. BLECH, *Primary Examiner.*

U.S. Cl. X.R.

260—29.1, 890, 891, 879, 80.7, 29.7, 41.5, 23.7, 33.6